May 25, 1965 D. M. TURNBULL ETAL 3,185,519

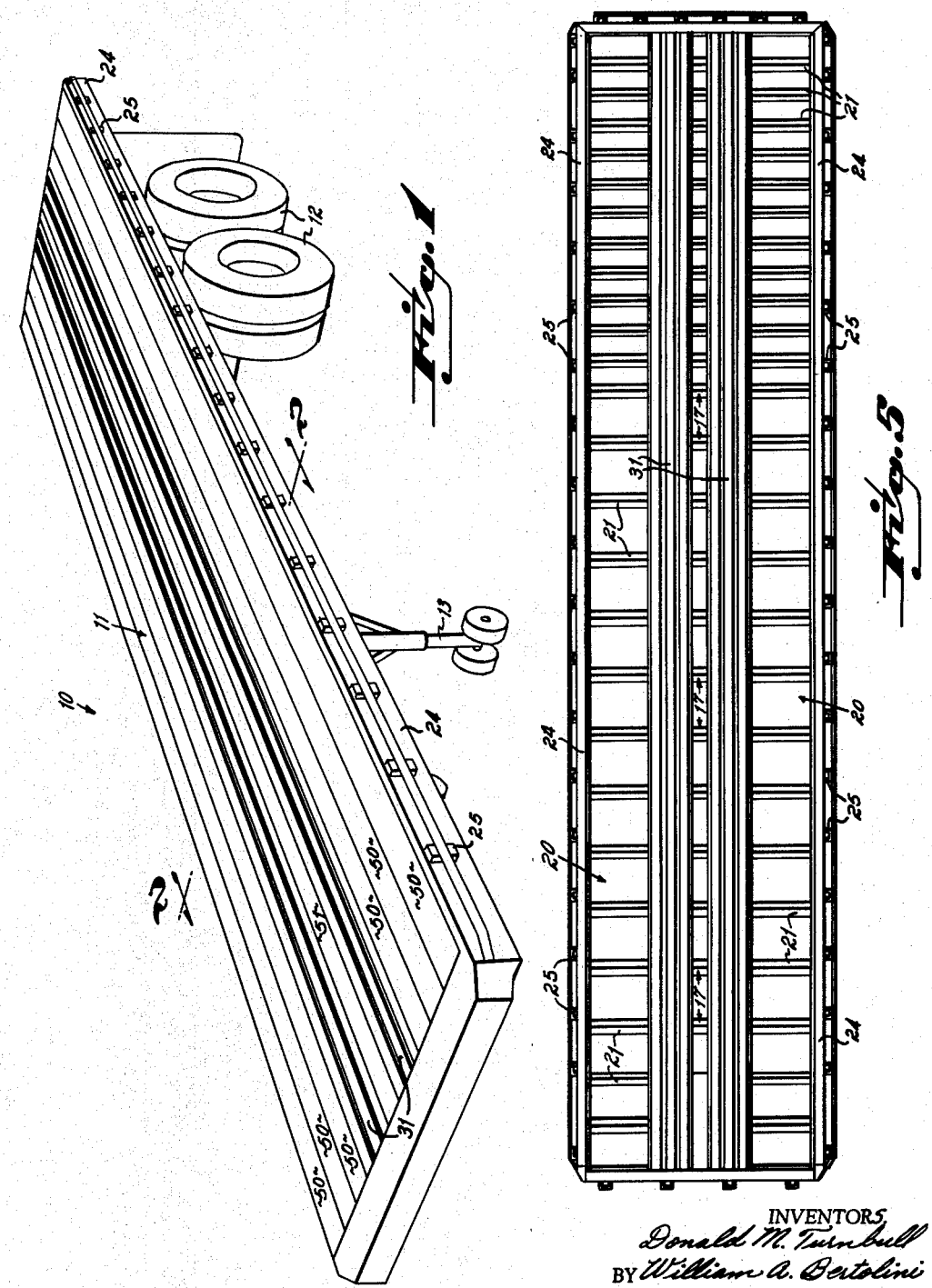

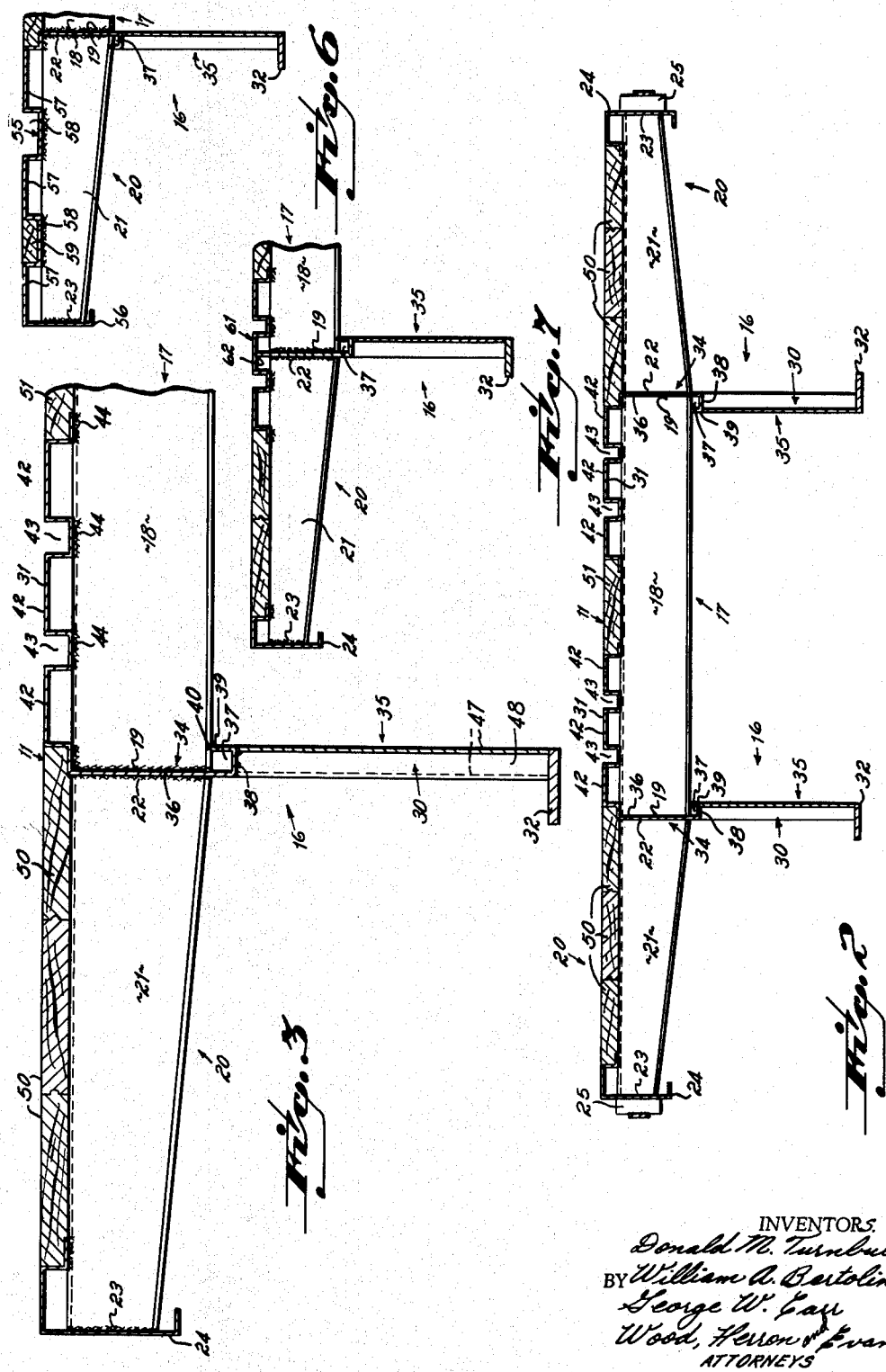

PLATFORM TRAILER

Filed Jan. 8, 1963 3 Sheets-Sheet 3

INVENTORS.
Donald M. Turnbull
BY William A. Bertolini
George W. Carr
Wood, Herron & Evans
ATTORNEYS

United States Patent Office 3,185,519
Patented May 25, 1965

3,185,519
PLATFORM TRAILER
Donald M. Turnbull, William A. Bertolini, and George W. Carr, Cincinnati, Ohio, assignors to Trailmobile Inc., Cincinnati, Ohio, a corporation of Delaware
Filed Jan. 8, 1963, Ser. No. 250,178
6 Claims. (Cl. 296—28)

This invention relates to a chassis structure for a platform or flat trailer.

The platform or flat trailer is distinguishable from an enclosed cargo trailer insofar as the chassis is concerned in that the chassis in the platform trailer must be structurally strong and rigid for it provides the sole support for the platform and the load which is carried on it. The enclosed cargo trailer, on the other hand, has a fairly lightweight chassis structure, and the side walls and posts which support them impart the needed rigidity to the combined trailer structure. In the absence of the side wall structure, the chassis and floor of the enclosed cargo trailer is quite flexible.

Because the platform trailer has no side walls fixed to its platform, it needs a rugged chassis to support the loads which it is required to haul and to withstand the rigors of traveling thousands of miles over roads of varying conditions.

The ultimate objective of a cargo hauling trailer is, of course, to haul as much of a load as possible at as low a cost as possible. Thus, for every pound by which the weight of the unloaded trailer can be reduced without sacrifice of the structural characteristics of the trailer, an added pound of pay load can be carried on the trailer, thereby reducing the cost per pound of hauling the pay load. Further, there are laws which limit the total combined weight of trailer and pay load, these laws being necessary in order to prevent the rapid degeneration of the highways over which the trailers pass. If the weight of the trailer can be reduced, then obviously the pay load can be increased while staying within the maximum combined load permitted by law.

In order to meet the requirements of their customers, it is common practice for trailer manufacturers to offer two types of flat trailers, namely, a lightweight trailer and a heavy-duty trailer. The heavy-duty trailer is required principally for hauling over rough road conditions and, in general, for withstanding a rigorous usage. The lightweight trailer, on the other hand, is employed where its usage, including road conditions, is not particularly strenuous. It can be acquired at a lower cost and, because of its lightweight, it is able to haul greater pay loads.

In both the heavy-duty and lightweight trailers, the basic support for the trailer and its load is derived from the two longitudinally extending main rails which are interconnected by transverse cross rails or bolsters. The main rails and bolsters are I-beams or the equivalent (channels, Z-beams and the like) whose principal function is to resist a vertical bending stress. In general, the heavy-duty trailer is distinguished from the lightweight trailer insofar as the supporting structure is concerned in the use of larger beam sections formed of a heavier gauge metal, usually steel. The combination of main rails and bolsters is referred to as the frame. The frame is covered with oak planks and has side rails secured to its side edges.

Because lighter materials are used in the lightweight frame, there is a tendency, under the stress of supporting a pay load and operating under road conditions, for the main rails to shift longitudinally with respect to each other. While the materials employed are certainly strong enough to withstand the stress accompanying the longitudinal shifting, the repeated stressing of the frame tends to generate fatigue failures in those areas of high stress concentration. To avoid failure through fatigue, it has been the practice to provide additional bracing of the main rails against the longitudinal shifting. One form of such bracing is the welding of a steel plate over the entire longitudinally extending area between the main rails, the sheet being welded to the main rails as well as the bolsters. Since the sheet or other bracing provides no appreciable resistance to static loading or transverse bending, it constitutes a dead weight and is employed at a sacrifice to the pay load or its cost per pound which can be carried.

It has been an objective of the present invention to provide a frame for a platform trailer which is stronger and more rigid than present heavy-duty trailers, and which is lighter and less expensive than present lightweight trailers. By way of example, the trailer of the present invention can carry twenty percent more load than either known heavy-duty or lightweight trailers and weights five percent less than the lightweight trailers and twenty percent less than the heavy-duty trailers. (It will be appreciated that these percentages are approximations, but in the trailer industry, the weights and carrying capacities of lightweight and heavy-duty trailers do not vary greatly from company to company.) Since the weight of an unloaded trailer is approximately ten thousand pounds, a five percent to twenty percent reduction in weight without sacrifice of strength will mean approximately five hundred to two thousand pounds of increased pay load which can be carried. When this increased pay load is multiplied by the thousands of miles over which a trailer operates, the value of the reduction in weight can be appreciated as being of considerable importance.

A further objective of the invention has been to provide a new main rail structure for a platform trailer, the structure comprising a combination of elements of light gauge metal combined in such a way as to be stronger and more rigid and less subject to fatigue than a standard beam of similar cross sectional area. The main rail structure of the invention may be broadly considered to be a beam having an upper flange, a central web and a lower flange. One of the elements of the combination is the upper flange which is of considerable lateral extent and is longitudinally corrugated. A number of advantages result from the configuration of the upper flange. It overlies a substantial portion of the frame bolsters and therefore eliminates the need for wood planks to form that portion of the floor occupied by the wide upper flange. In fact, more than one-third of the floor area normally formed of heavy planks is occupied by the light gauge upper flange, which results in a reduction in the over-all weight of the trailer. As another feature of the invention, the upper flange is welded to the upper surface of the bolsters and eliminates the need for additional bracing to withstand the tendency of the main rails to shift longitudinally with respect to each other. Thus, a further reduction in weight is attained through the elimination of the steel bracing plate. Still further, the longitudinal corrugating of the upper flange will greatly increase the ability of the flange to withstand a compression stress, thereby permitting the use of an upper flange of less cross sectional area than would be required for a planar upper flange. Again, a reduction in the over-all weight of the trailer is attained.

It is still another objective of the invention to provide a composite beam employed as a main rail for a platform trailer, the beam having a lower web section of substantial height and being formed of vertically corrugated light gauge sheet metal. The web is sandwiched between a lower flange and an upper web section, or upper flange, and is welded only along the longitudinally extending portions of the edge, the transversely extending edge portions being free to move with respect to the contiguous metal members. The incremental welding permits a slight shifting of the web with respect to the lower flange and upper portion without unduly stressing or fatiguing the welded joints. Through the use of the web configuration of the present invention, the thickness of the web material need be only approximately one-fifth that which would be required of the web in a beam having the same height. Again, a substantial weight reduction is attained while obtaining the benefits of the strength and rigidity of a beam of substantial height.

The several features and objectives of the invention will become more readily apparent from the following detailed description taken in conjunction with the accompanying drawings in which:

FIG. 1 is a perspective view of a flat trailer employing our invention,

FIG. 2 is a cross sectional view taken along lines 2—2 of FIG. 1,

FIG. 3 is an enlarged fragmentary cross sectional view similar to FIG. 2,

FIG. 5 is a top plan view of a trailer with the wooden planking removed, FIG. 6 is a fragmentary cross sectional view showing an alternative form of the invention, FIG. 7 is a fragmentary cross sectional view showing still another form of the invention.

Figure 4:
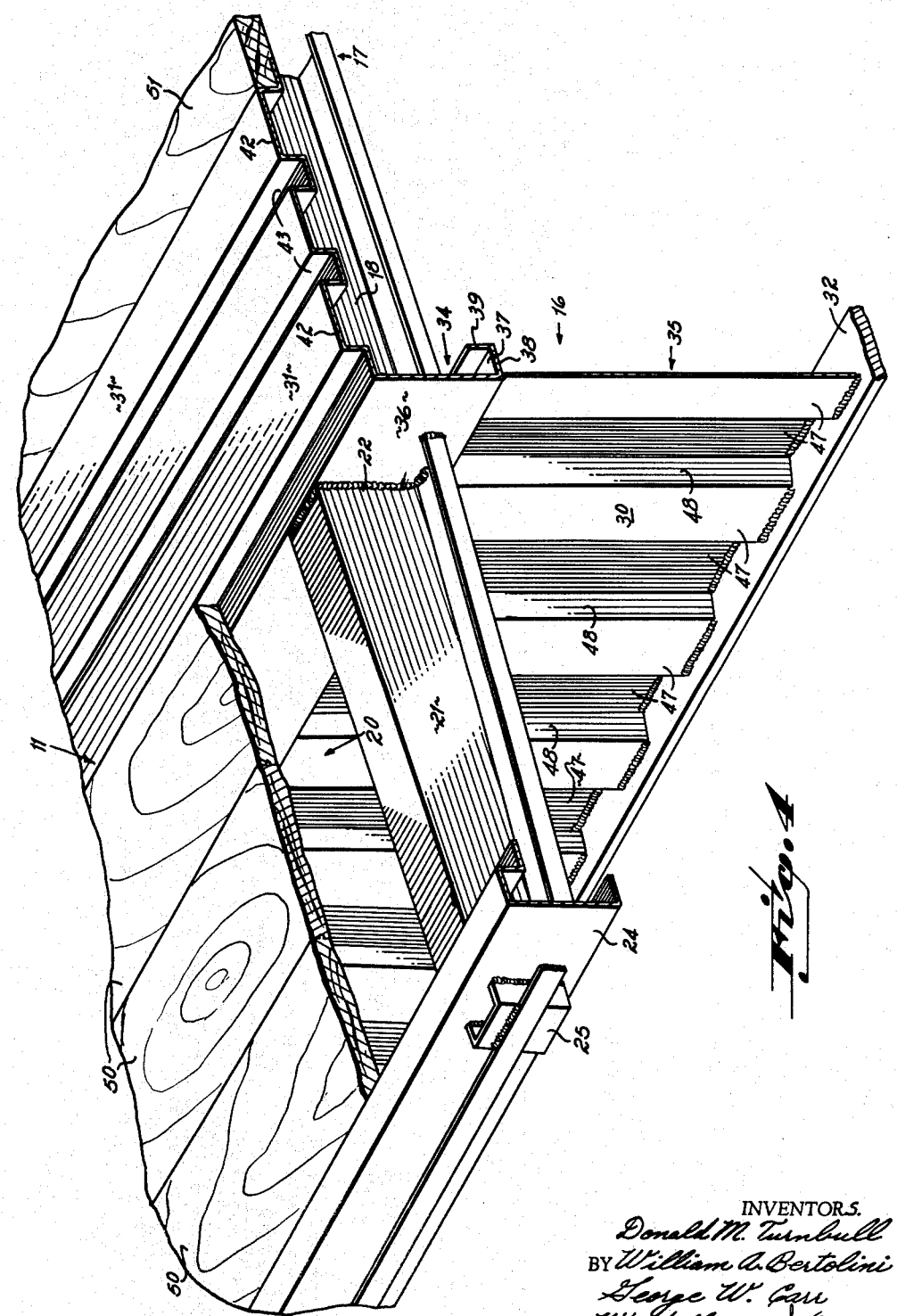
FIG. 4 is a fragmentary perspective view of a main rail and portions of the cross rails connected to it.

A platform or flat trailer of the type to which the present invention is directed is illustrated in FIG. 1. The trailer 10 comprises a floor 11 supported on a frame which will be described in detail below and which forms the essential part of this invention. The frame, in turn, is secured at its rear end to a suspension including wheels 12. At the forward end, when not in use, the trailer is supported on landing gears 13. The forward end of the trailer has an upper fifth wheel including a kingpin, not shown, by which the trailer is secured to the lower fifth wheel of a tractor in a manner well known in the art.

The frame is shown in FIGS. 2, 3 and 4 and comprises longitudinally extending main rails 16 interconnected by transversely extending cross rails 17. In the illustrated form of the invention, the cross rails 17 comprise bolsters 18 which are welded at their ends 19 to the main rails 16. The trailer has an outboard section 20 projecting laterally from each main rail, the outboard section being supported by outriggers 21 which are Z-beams having inner ends 22 welded to the main rail 16. The outriggers have outer ends 23 which are capped by a generally C-shaped outer rail 24. The outer rails 24 have supports 25 for receiving posts by which temporary side walls may be secured to the trailer.

While, in the illustrated form of the invention, the cross rails are formed by separate bolsters and outriggers which are welded to the main rail, it should be understood that each cross rail can be a unitary element extending the full width of the trailer and passing through apertures in the main rail.

Each main rail has a web 30, an upper flange 31, and a lower flange 32. The invention is directed to the specific structure of the main rails and the manner in which the flanges and webs are configurated and interconnected to each other to provide unusual structural rigidity and strength while having a low weight per unit of length.

In the form of FIGS. 2–5, the web 30 has an upper section 34 and a lower section 35. The upper section 34 and the upper flange 31 are a unitary element formed in a rolling mill. The upper web section includes a vertical, planar plate 36 to which the bolsters and outriggers are welded and has, forming its lower edge, a U-shaped section 37. The U-shaped section has a horizontal middle portion 38 which provides an intermediate flange to which the lower web section is joined in a manner to be described below. The U-shaped section 37 has a free leg 39 on which the bolster 18 rests and to which the bolster 18 is welded as at 40. The interconnection of the bolster, the free leg 39 and the intermediate flange 38 provides a rigid structure which prevents the buckling or waving of the intermediate flange 38 under the stress of operating conditions.

The upper flange 31 is longitudinally corrugated to form alternating ribs 42 and recesses 43 and has a substantial transverse or width dimension. For example, in a trailer which is ninety-six inches wide, the transverse dimension of the combined upper flanges is thirty-three and one-half inches. The upper flange is welded as at 44 at the bottom of the recesses 43 to the bolsters 18. The longitudinal corrugating of the upper flange provides great resistance to bending or buckling, and the welding of the upper flange to the cross bolsters at locations extending over a considerable transverse distance rigidifies the frame structure and resists any tendency of the main rails to shift longitudinally with respect to each other.

The lower portion of the main rail is formed by the lower web section 35 and the lower flange 32. The lower web section is formed by a vertically corrugated sheet, best illustrated in FIG. 4. The vertically corrugated sheet presents upper and lower edges in engagement with the intermediate flange 38 and lower flange 32 respectively. These edges have longitudinally extending portions 47 which are welded to the respective intermediate and lower flanges and portions 48 which extend transversely at 60° to the edge portion 47. The transverse portions 48 preferably remain free of fixed engagement with the respective webs. The welded longitudinally extending edge portions 47 securely join the vertically corrugated sheet to the respective flanges while the free, transversely extending edge portions are free to shift slightly with respect to the flanges when the rails are subjected to bending stress. The freedom to shift avoids the concentration of localized stress which might tend to cause a fatigue failure in the main rail. Thus, this accordion-like action protects the steel of the web against the high stresses which are induced in the lower flange by the applied loads.

It is well known in beam construction that the greater the height of the beam, that is, the distance between the upper and lower flanges, the greater is the beam's resistance to bending stress. However, an increase in the distance between the upper and lower flanges normally requires an increase in the thickness of the web section in order for it to resist buckling. Through the use of a vertically corrugated web, the desired distance between the upper and lower flanges can be attained with a web thickness which is markedly less than that normally employed. For example, the over-all height of beam in one embodiment of the invention is twenty-four inches. A planar web between the flanges would require a web approximately five times as thick as the corrugated web 35.

After the frame elements have been joined together as described above, the upper surface of the trailer appears as shown in FIG. 5. A substantial portion, approximately one-third, of the cross bolsters has been covered by the two upper flanges 31. The remainder of the upper surfaces of the cross bolsters is overlaid with oak planks 50 on the outboard section of the trailer and a narrow eight inch section which could be a single plank 51 in the space between the adjacent upper flanges 31. Since the weight per unit of area covered of the light gauge upper flange is substantially less than the weight per unit of area of the planks 50, the utilization of the upper flange as a substantial portion of the floor of the trailer results in a reduction in the unloaded weight of the trailer.

In the alternative form of the invention illustrated in FIG. 6, all of the elements are the same except that the upper flange, now indicated at 55, overlies the outriggers 21 rather than the central bolsters 18. The upper flange 55 has at its outward edge a depending L-shaped flange 56 which engages the outer ends 23 of the outriggers 21 and eliminates the requirement of an outer rail 24 as shown in the first described embodiment.

The upper flange 55 is longitudinally corrugated to provide the ribs 57 and recesses 58 as described in connection with the upper flange 31. One or more of the recesses 55 may have a plank 59 disposed in it and bolted to it to provide a wooden floor portion into which spikes can be driven for the purpose of forming a part of the means by which the goods are secured to the trailer floor.

In the embodiment of FIG. 7, the elements are the same as previously described except for the upper flange indicated at 61. In the embodiment of FIG. 7, the upper flange is joined to the upper web section at a location 62 intermediate the longitudinal edges of the upper flange so that the upper flange and upper web section have a T configuration in cross section. The embodiment of FIG. 7 has the advantage of bringing the longitudinal edges of the upper flange in closer proximity to the upper web section and thereby reducing the tendency of the extremities of the upper flanges to buckle. The upper flange 61 is shown as being welded to the edge of the upper web section. However, it should be understood that the main rail can be formed of aluminum, or other lightweight metal, and the upper flange and upper web section can be formed as an integral extrusion.

In all of the embodiments, the upper flange is preferably longitudinally corrugated to provide the resistance to buckling as described above and to bring the upper surface of the rib portions into the same plane as the upper surfaces of the planks, thereby providing a substantially uniform upper surface for the floor of the trailer. Additionally, in all embodiments, the upper flanges overlie a substantial area of the cross rails and are welded at the bottoms of the recesses to the cross rails. Thus, the upper flanges eliminate as much as thirty percent or even more of the heavy wood planking and at the same time prevent the tendency of the main rails to shift longitudinally with respect to each other, thereby eliminating the need for separate bracing against such longitudinal shifting.

Having described our invention, we claim:

1. In a trailer frame having two spaced parallel main rails interconnected by a plurality of spaced parallel cross rails, the main rail comprising,
   an upper web section joined to said cross rails,
   a longitudinally corrugated upper flange integral with said upper web section and overlying a substantial portion of said cross rails, said upper flange being fixed to said cross rails,
   a vertically corrugated lower web section having longitudinally extending edge portions and transversely extending edge portions, and,
   a lower flange,
   said lower web section being welded to said lower flange and said upper web section only along said longitudinally extending edge portions.

2. In a trailer frame having two spaced parallel main rails interconnected by a plurality of spaced parallel cross rails, the main rail comprising,
   an upper web section joined to said cross rails,
   a longitudinally extending upper flange integral with said upper web section and overlying a substantial portion of said cross rails, said upper flange being fixed to said cross rails,
   a vertically corrugated lower web section having longitudinally extending edge portions and transversely extending edge portions, and,
   a lower flange,
   said lower web section being welded to said lower flange and said upper web section only along said longitudinally extending edge portions.

3. In a trailer frame having two spaced parallel main rails interconnected by a plurality of spaced parallel cross rails, the main rail comprising,
   an upper web section joined to said cross rails having an intermediate flange,
   a vertically corrugated lower web section having longitudinally extending edge portions and transversely extending edge portions, and,
   a lower flange,
   said lower web section being welded to said lower flange and said intermediate flange only along said longitudinally extending edge portions.

4. In a trailer frame having two spaced parallel main rails interconnected by a plurality of spaced parallel cross rails, the main rail comprising,
   an upper web section joined to said cross rails, said upper web section being planar between its upper and lower edges,
   a vertically corrugated lower web section fixed to said upper web section and having longitudinally extending edge portions and transversely extending edge portions, and,
   a lower flange,
   said lower web section being welded to said lower flange and said upper web section.

5. In a trailer frame having two spaced parallel main rails interconnected by a plurality of spaced parallel cross rails, the main rail comprising,
   a composite web having a planar upper section joined to said cross rails,
   a longitudinally corrugated upper flange integral with the upper section of said web and overlying a substantial portion of said cross rails, said upper flange being fixed to said cross rails, said web having a vertically corrugated lower section,
   a lower flange secured to the lower section of said web.

6. A platform trailer comprising,
   two spaced, parallel longitudinally extending main rails, each constituted by a planar upper section and a vertically corrugated lower section,
   a plurality of spaced parallel bolsters extending transversely between the planar upper sections of said main rails and being secured at their ends to said main rails,
   a plurality of spaced parallel outer rails projecting transversely from the planar upper sections of said main rails,
   each said main rail having an integral upper flange overlying and secured to the upper surfaces of a portion of said transverse rails,
   said upper flanges forming approximately one-third of the floor area of said trailer.

References Cited by the Examiner

UNITED STATES PATENTS 2,812,192  11/57  Cole _____ 296—28 X
2,846,263  8/58   La Rue _____ 296—28
2,926,928  3/60   Bennett _____ 296—28 X

FOREIGN PATENTS 1,023,079  12/52  France.
   61,916  12/54  France.

A. HARRY LEVY, *Primary Examiner.*